Patented Oct. 11, 1932

1,881,557

UNITED STATES PATENT OFFICE

GUSTAF OLOF WOLFGANG HEIJKENSKJÖLD, OF STOCKHOLM, SWEDEN, ASSIGNOR TO AKTIEBOLAGET BÄSTA, OF STOCKHOLM, SWEDEN, A CORPORATION

METHOD OF MANUFACTURING YEAST

No Drawing. Application filed November 3, 1925, Serial No. 66,599, and in Sweden March 28, 1925.

As is well known, yeast for making bread or the like is manufactured by the propagation of yeast fungi. The yeast cells require for their growth a nutritive liquid containing chiefly sugar in soluble form, such sugar being usually produced by transformation of starch contained, for instance, in grain. It has also been found possible to produce excellent yeast by means of the sugar in molasses.

However, there is a material which occurs in great quantities and which contains sugar to a considerable extent, namely, the waste liquor from the sulphite process of manufacturing paper or the like. The percentage of sugar in such sulphite waste liquor is approximately 2.5%, about 1.6% thereof being fermentable saccharine matter which may consequently be used for producing yeast, whereas the rest, 0.9%, is fermentable only with difficulty, or, perhaps, not at all.

The present invention provides a method of producing yeast which comprises using sulphite waste liquor either wholly or partly as raw material. With this material, no favourable results were previously obtained. Instead of sulphite sugar, other wood sugar may also be used, produced, for instance, by treating wood with highly concentrated hydrochloric acid or the like.

The invention also involves different stages of operation by means of which it is possible to utilize sulphite waste liquor to produce a yeast of the same quality as that produced from ordinary raw materials, for instance grain. To accomplish this, the sulphite waste liquor may be used wholly or partly as starting material.

According to a preferred embodiment, the method is carried out in the following manner:

*Cleaning the sulphite waste liquor*

The sulphite waste liquor which, in addition to the percentage of sugar of about 2.5%, also contains about 12% other organic matter, chiefly in a colloidal state, as well as a residue of sulfurous acid, must evidently first be freed from all sulfurous acid. For this purpose one or more substances are added to the waste liquor, said substances having the property of being able to neutralize the acid in the liquor, and being added in such quantity that the liquor is brought to a state suitable for fermentation. The quantity of the substance or substances added may be so proportioned that the waste is wholly neutralized, or it may be made alkaline. As a neutralizing agent, limestone or other calciferous material is preferably used. This first step in the treatment of the liquor can be considerably improved by using, as a neutralizing agent, a substance in a finely divided state having the property mentioned above, that is to say, of being able to neutralize the acid in the liquor. By this means, not only will the neutralizing material be better utilized, but simultaneously an additional effect will be obtained in that the impurities in the liquor occurring chiefly in a colloidal state will be carried away mechanically when the precipitate formed on neutralization of the liquor deposits. By this means the liquor is rendered clear without further measures and will give an excellent yeast.

As preferred agent for this compensating treatment, I use powdered limestone. Powdered limestone is used because it not alone reduces the acidity but also acts as a precipitator, causing precipitation of material in solution in the liquor, the precipitant gathering in the lower part of the neutralizing tank from which it may be blown out through blow-off pipe 18. The additional important effect is obtained by the use of limestone that the limestone and the precipitate formed by the limestone carry with them, on slowly sinking to the bottom of the neutralizing tank, the impurities suspended in the liquor in colloidal form. Besides reacting with sulfurous acid, limestone recast with soluble bi-sulphite of calcium in forming insoluble neutral sulphite of calcium which, on depositing, carries with it colloidal matters.

Another material, which may be used with good result as a neutralizing agent, is the calciferous waste leach from the sulphate process of manufacturing paper or the like. The use of this material is especially preferred, when the yeast factory is situated in the vicinity of a sulphate pulp factory as in most cases it may be obtained without any cost.

The precipitate formed on adding a neutralizing agent to the sulphite liquor deposits at the bottom of the container used, and the clear solution may then be separated by decantation or the like. If desired, nutritive substances may be added to the liquor before the precipitate deposits. It is also preferable to expose the waste liquor to aeration, either before or after decantation, so that no precipitation will occur in the liquor on the subsequent aeration in the fermenting vessel, and so that volatile impurities will be removed. This is also the case with substances which would otherwise precipitate during the growth of the yeast under the influence of the yeast fungi and, perhaps, of other micro-organisms, which would, consequently, reduce the quality of the yeast. If the liquor is perfectly clear, it may be used immediately for the production of yeast, suitable nutritive substances being added to the solution, such as ammonium sulphate, superphosphate, ferrous sulphate, alum and the like, while the solution is made acid or basic according to the method of operation to be used. In general, however, a further treatment of the liquor is necessary, in order to make the same suitable for the production of yeast. This further treatment may be effected in different ways.

The decanted solution may be passed through a layer of a suitable filter material placed on a strainer or the like. This filter material may consist of malt sprouts, the liquor dissolving nutritive substances from said malt sprouts, and on being filtered through said malt sprouts, the liquor becomes perfectly clear.

A precipitant may also be added to the decanted liquor before it is subjected to fermentation, said precipitant having the property of permitting a rapid filtration, and consisting, for instance, of a salt which is easily hydrolyzable, such as aluminum sulphate, the liquid being then passed through a sand filter, preferably of the same kind as is used in purifying drinking-water. This method will also result in a clear solution.

Another method of purifying the decanted solution before it is brought to fermentation comprises bleaching the solution by means of a suitable bleaching agent, which is either oxidizing or reducing. Good results have been obtained by using calcium hypochlorite, although this substance is a very strong bleaching agent, but in this case it is of course necessary to take care that all chlorine is removed before the liquid is brought to fermentation.

Two or more of the methods for further treatment of the liquor as mentioned above may be used simultaneously or in succession, in different combinations.

The yeast propagation

The yeast propagation is carried out according to known methods, with the use of sufficient aeration to prevent the formation of alcohol. Preferably, the propagation is started only with a portion of the wort as well as with a portion of the requisite nutritive substances, and then, as soon as the yeast has commenced to grow, the remaining portion of the wort and of the nutritive substances is added by degrees. At the end of the growth, the wort is preferably neutralized, in order to prevent corrosion of the separators. It is also possible to add to the yeast wort flocking micro-organisms, which are harmless to the yeast, and then to separate the yeast by decantation.

In producing yeast from sulphite waste liquor it has proved difficult to obtain good yields in the time normally required in producing yeast from the raw materials hitherto known. This is due to the fact that the fermenting power of the seed yeast is not sufficient for effecting a growth of the yeast at the rate desired in the relatively unfavourable nutritive liquid used.

It has been found, however, that the yield may be considerably increased, and the time of fermentation much reduced, by first sowing the seed yeast in a solution, the percentage of sugar of which is higher than that of the solution or solutions supplied to the fermenting vessel during fermentation.

This may be effected by sowing the seed yeast in a relatively pure solution of sugar, for instance, a solution of molasses, said solution having a percentage of sugar which is higher than that of the sulphite waste liquor used in the further course of fermentation.

During the first period of fermentation the growth depends in a large measure on the quantity of albumins and other easily assimilable nitrogen compounds. The yeast cells have the property of being able to store considerable amounts of nitrogen compounds, such as albumins, said compounds serving then as a complement to the growth of the yeast in solutions which are poor in suitable nitrogen compounds. By thus separately growing yeast in a solution containing a large amount of sugar a seed yeast is produced which is capable of rapid growth in sulphite liquor which may be relatively weak in sugar because the seed yeast can make use of the nitrogen stored up in itself. This growth of seed yeast in a manner to cause the same to accumulate nitrogen I term super-nourishment.

The super-nourishment of the seed yeast should be carried as far as possible, and beyond 2.5% of sugar content of the seed yeast. If not carried to a sufficiently high degree to obtain the desired effect, the missing quantity of sugar may be made up by addition of malt sprouts. In the manufacture of yeast, malt sprouts are usually used as a nitrogen nutriment, said material being very suitable for this purpose, which fact possibly depends upon its great contents of vitamins. This material is very expensive, however. Now, it has been found that the substances stored in the yeast contain vitamins themselves, and that a seed yeast may be obtained by increasing the quantity of said substances by super-nourishment at a prior stage of manufacture, said seed yeast containing substances which, in addition to the less nutritive substances in the sulphite liquor, are sufficient to insure a rapid and favorable growth during the first stage of the fermentation process.

This super-nourishing effect may be carried to different stages. When it is not carried as far as possible, the missing quantity of suitable nutriment may be covered by the addition of extracts of malt sprouts. Such addition, however, should always be kept less than normal, and in no case should it exceed 50 to 100, or a maximum of 200 kilograms of malt sprouts per 1000 kilograms of sugar present in the liquor or, what amounts to the same, per 1000 kilograms of yeast obtained. If organic nitrogen of other kinds is used, the quantity of such material should correspond to that calculated for malt sprouts.

*The separation of the yeast from the wort*

The yeast is separated from the fermented wort by means of yeast separators. During the separation of the yeast water is supplied to the separators in order to effect washing of the yeast, that is to say, substituting pure water as thoroughly as possible for the wort which remains between the yeast cells. The quantity of water supplied to the separators is rather great, preferably equal at least to the quantity of wort to be separated. The yeast crop thus obtained is preferably diluted with water once more, and again separated while adding water to same. This separation with the addition of water may be repeated several times. The yeast on having been separated once or repeatedly, is then pressed dry in a filter press.

At the first, second, third etc. separation and washing of the yeast, a small amount of a suitable reagent or reagents may be added to the washing-water, in order to facilitate the separation of the yeast from the wort. For instance, a small amount of ammonia may be added, and in this case further washing with water containing a small amount of hydrochloric or sulphuric acid will be necessary, before the yeast is pressed.

In manufacturing yeast from sulphite waste liquor used wholly or partly as raw material, it may be suitable to give the yeast an opportunity to utilize not only sulphite sugar or other wood sugar but also sugar from molasses or other sugar sources. All sugar solutions used for the manufacture of yeast should, however, be subjected to a suitable treatment prior to fermentation.

In carrying out the invention, propagation may take place in a wort formed by mixing a solution comprising acid waste sulphite liquor treated as above described and a solution comprising treated molasses diluted in water, to which mixture additional nutriments comprising nitrogen, phosphorous, potassium, magnesium, iron and the like are added. Yeast obtained in this manner may be further treated by what I term a "ripening" process. In the ripening process, the yeast separated from the liquor is placed in a fermentation vessel containing a solution of molasses or other such sugar solution, aeration being used in such subsequent treatment as well as in the initial fermentation. This ripening process improves the appearance, taste, smell and the fermenting power of the yeast.

In order to obtain the greatest possible yield of yeast and to minimize formation of alcohol, propagation is started in a portion of the wort whereafter the remainder is added by degrees. For example, propagation may be started in one tenth of quantity of a wort comprising a mixture of solutions prepared from acid waste sulphite liquor and molasses, the remainder being added by degrees. After propagation has been started in a portion of the wort, the remainder is preferably added continuously over a period of time. The concentration of the added wort may be varied from time to time.

Propagation may be begun in a wort obtained by treating molasses and containing no acid waste sulphite liquor, the liquor solution treated as above described being added to the molasses wort after propagation has begun.

Instead of separately preparing solutions of waste sulphite liquor and molasses, molasses, which has not been subjected to prior treatment for yeast purposes, may be mixed with the acid waste sulphite liquor, the mixture being treated as above described.

As another manner of carrying out a phase of the invention, sulphite waste liquor, pretreated in the manner above set forth, may be introduced into a fermentation vessel whereupon molasses, evaporated sulphite waste liquor or other material having a higher percentage of sugar than that of the waste sulphite liquor, is added in such amount that a concentration of from 2% to 3% of sugar is obtained, the wort is raised to a temperature of about 30° C., seed yeast is added and, when the growth has started, the percentage of sugar in the vessel is decreased by the addition of water or waste sulphite liquor.

The acid treatment of wood for obtaining sugar solutions has been previously known, as outlined herewith.

In the year 1856 Béchamp discovered that sugar could be obtained from wood by treating wood with an acid. This was done practically with hydrochloric acid 25 years later by Dangevilliers. In 1913 Willstätter published a method which is now being used after it has been further developed by Erik Hägglund and Friedrich Bergius. The wood is successively treated with hydrochloric acid and in this way a solution is obtained which contains 42–44% sugar and which solution in order to recover the hydrochloric acid is distilled in vacuum. This results in a solution containing about 50% of sugar and 8% of hydrochloric acid. This sugar may also be obtained in a dry shape by treating the solution with hot air. The powder obtained contains 89–90% sugar and about 2% of hydrochloric acid. The sugar contains

|  | Per cent |
|---|---|
| Glucose | 62 |
| Mannose | 25 |
| Galactose | 4 |
| Xylose | 8 | and thus the largest part thereof is fit for yeast propagation.

In spite of a concentration of hydrochloric acid of up to 8–10% these sugar solutions may according to applicant's invention be used for yeast propagation.

I am aware that acid liquors derived from wood and containing sugar have been utilized as disclosed in U. S. Patent to Roemer No. 1,510,195, granted June 14, 1927, and U. S. patent to Raeth No. 1,632,312 granted June 14, 1927; but the adaption of these sugars containing solutions to yeast propagation is not suggested or taught by their use for fermentation.

The method found suitable for yeast propagation may be carried out as follows:

The sugar solution is diluted with water to a concentration suitable for yeast propagation, for instance 2% of sugar. The hydrochloric acid in the solution is neutralized with powdered limestone ($CaCO_3$), slaked lime ($Ca(OH)_2$) or quick lime ($CaO$), for instance, according to the formula:

$$2HCl + Ca(OH)_2 = CaCl_2 + 2H_2O,$$

the hydrochloric acid being combined with the lime as calcium chloride in solution. At a sugar concentration of 2% about 2.5 kg lime per m³ is required. The concentration of calcium chloride in the solution is then about 0.48% and this concentration has no detrimental effect if the yeast propagation is carried out according to the invention, the nutritive liquor being successively added and the wort strongly aerated.

In order to produce a seed yeast which is suitable for the wort to be used, it is preferred to start with a yeast produced from a pure sugar solution and to allow the yeast to adapt itself to the wort to be used. This is effected by first sowing the yeast in the solution from which it is produced, and then sowing it in worts which, with regard to their composition, more and more approach the wort to be used, the yeast being finally sown in such wort in a pure state. When starting, for instance, from yeast produced with molasses, and when sulphite waste liquor pre-treated in the manner above set forth is to be used for the yeast production, then the yeast is first caused to grow in a solution of molasses. The second generation thus obtained is then caused to grow in a wort containing molasses and a small quantity of sulphite waste liquor, the third generation thus formed being caused to grow in a wort containing molasses and a greater quantity of sulphite waste liquor etc. so that the wort contains more and more of sulphite waste liquor and less and less of molasses, and the yeast is finally caused to grow in a wort of pure sulphite waste liquor. Thus a seed yeast is obtained which is very suitable for the method according to the invention.

The solution obtained after the yeast crop has been separated may be utilized in different manners, as for instance as an adhesive or as an addition to the water used on watering streets for the purpose of binding dust or the like. This solution may also be dried by evaporation and the material thus obtained may be utilized as fuel or in other suitable ways.

What I claim is:—

1. The method of manufacturing yeast by utilizing acid liquor derived from wood and containing sugar material, which comprises treating the acid liquor to reduce the acidity thereof, adding the treated liquor by degrees to a yeast propagating wort, aerating the wort to substantially prevent formation of alcohol, separating the yeast from the wort, and washing the separated yeast.

2. The method of manufacturing yeast by utilizing acid liquor derived from wood and containing sugar material, which comprises treating the acid liquor to reduce the acidity thereof while aerating the same and precipitating impurities therefrom, adding the treated liquor by degrees to a yeast propagating wort, aerating the wort to substantially prevent formation of alcohol, separating the yeast from the wort, and repeatedly washing the separated yeast until the hydrochloric acid and other contaminations are removed.

3. The method of manufacturing yeast by utilizing acid liquor derived from wood and containing sugar material, which comprises treating the acid liquor to reduce the acidity thereof, planting propagative seed yeast in a wort of high sugar concentration, and continuing propagation by slowly adding the treated liquor to the wort.

4. The method of manufacturing yeast by utilizing acid liquor derived from wood and containing sugar material, which comprises treating the acid liquor to reduce the acidity thereof, planting propagative seed yeast in a wort of high sugar concentration, and continuing propagation by slowly adding the treated liquor to the wort while aerating the wort to substantially prevent formation of alcohol.

5. The method of manufacturing yeast by utilizing acid liquor derived from wood and containing sugar material, which comprises treating the acid liquor to reduce the acidity thereof at least to the neutral point, planting propagative seed yeast in a wort of high sugar concentration, and continuing propagation by slowly adding the treated liquor to the wort while aerating the wort to substantially prevent formation of alcohol.

6. The method of manufacturing yeast by utilizing acid liquor derived by treating wood with highly concentrated hydrochloric acid and containing sugar material, which comprises treating the acid liquor to reduce the acidity thereof, adding the treated liquor by degrees to a yeast propagating wort, aerating the wort to substantially prevent formation of alcohol, separating the yeast from the wort, and repeatedly washing the separated yeast.

7. The method of manufacturing yeast by utilizing acid liquor derived by treating wood with highly concentrated hydrochloric acid and containing sugar material, which comprises treating the acid liquor to reduce the acidity thereof, planting propagative seed yeast in a wort of high sugar concentration, and continuing propagation by slowly adding the treated liquor to the wort.

8. The method of manufacturing yeast by utilizing acid liquor derived from wood and containing sugar, which comprises treating the acid liquor to reduce the acidity thereof, planting propagative seed yeast in a wort more favorable for yeast propagation than said liquor, and continuing propagation by slowly adding the treated liquor to the wort.

9. The method of manufacturing yeast by utilizing acid liquor derived from wood and containing sugar, which comprises treating the acid liquor to reduce the acidity thereof, planting propagative seed yeast in a sugar solution more favorable for yeast propagation than said liquor, and continuing propagation by slowly adding the treated liquor to the wort.

10. The method of manufacturing yeast by utilizing acid liquor derived from wood and containing sugar, which comprises treating the acid liquor to reduce the acidity thereof, planting propagative seed yeast in a wort of molasses, and continuing propagation by slowly adding the treated liquor to the wort while aerating the wort to substantially prevent formation of alcohol.

11. The method of manufacturing yeast by utilizing acid liquor derived from wood and containing sugar, which comprises treating the acid liquor to reduce the acidity thereof, planting super-nourished seed yeast rich in nitrogen in a wort composed of said liquor, and continuing propagation by slowly adding the treated liquor to the wort.

12. The method of manufacturing yeast by utilizing acid liquor derived from wood and containing sugar, which comprises treating the acid liquor to reduce the acidity thereof, planting super-nourished seed yeast rich in nitrogen in a wort of high sugar concentration, and continuing propagation by slowly adding the treated liquor to the wort.

13. The method of manufacturing yeast by utilizing acid liquor derived from wood and containing sugar, which comprises treating the acid liquor to reduce the acidity thereof, planting propagative seed yeast in a sugar solution rich in nitrogen, and continuing propagation by slowly adding the treated liquor to the wort.

14. The method of manufacturing yeast by utilizing acid liquor derived from wood and containing sugar, which comprises treating the acid liquor to reduce the acidity thereof, filtering the treated liquor through a layer of malt sprouts to accumulate organic nitrogenous matter in said liquor, adding the treated liquor by degrees to a yeast propagating wort, separating the yeast from the wort and washing the separated yeast.

15. The method of cultivating yeast which comprises starting yeast propagation in a wort of high sugar concentration, and continuing propagation by adding a wort comprising acid liquor derived from wood and toxic to yeast and containing sugar.

In testimony whereof I affix my signature.

GUSTAF OLOF WOLFGANG HEIJKENSKJÖLD.